(12) United States Patent
Ash

(10) Patent No.: US 7,958,432 B2
(45) Date of Patent: Jun. 7, 2011

(54) VERIFICATION OF NON VOLATILE STORAGE STORING PRESERVED UNNEEDED DATA

(75) Inventor: Kevin John Ash, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1091 days.

(21) Appl. No.: 11/734,129

(22) Filed: Apr. 11, 2007

(65) Prior Publication Data

US 2008/0256286 A1 Oct. 16, 2008

(51) Int. Cl.
*G11C 29/00* (2006.01)
(52) U.S. Cl. .......... 714/770; 714/22; 714/758; 327/143; 711/106; 711/114
(58) Field of Classification Search .................. 714/758, 714/721, 724, 770, 22; 327/143; 711/106, 711/114
See application file for complete search history.

(56) References Cited

U.S. PATENT DOCUMENTS

| 4,138,719 | A | * | 2/1979 | Swanstrom et al. | 358/1.18 |
| 5,519,831 | A | * | 5/1996 | Holzhammer | 714/22 |
| 6,536,003 | B1 | | 3/2003 | Gaziello et al. | 714/710 |
| 7,024,603 | B1 | | 4/2006 | Lin et al. | 714/720 |
| 7,487,421 | B2 | * | 2/2009 | Damodaran et al. | 714/733 |
| 2004/0193880 | A1 | * | 9/2004 | Walmsley | 713/168 |
| 2006/0139069 | A1 | * | 6/2006 | Frank et al. | 327/143 |

\* cited by examiner

*Primary Examiner* — Guy J Lamarre
(74) *Attorney, Agent, or Firm* — John H. Holcombe

(57) ABSTRACT

Non volatile storage may be employed to temporarily store data which is destaged to data storage drives. The non volatile storage is configured to preserve the data through a power outage. Some data may be preserved, but is not needed, such as the result of a failover to another non volatile storage. This unneeded data is tested to verify the non volatile storage by indicating whether the data survived the power cycle from full power to self refresh mode battery power to full power, without risking the loss of data that is needed.

20 Claims, 4 Drawing Sheets

VERIFICATION OF NON VOLATILE STORAGE STORING PRESERVED UNNEEDED DATA

FIELD OF THE INVENTION

This invention relates to data storage, and, more particularly, to non volatile storage configured to, if needed, store data despite a power loss.

BACKGROUND OF THE INVENTION

Data storage subsystems provide a capability for storage of large amounts of data, for example, in data storage subsystems having data storage drives. The data may be temporarily stored in non volatile storage, such as battery backed memory, while it is being stored in the data storage drives and/or transmitted to a remote site for backup storage. Thus, if there is a power outage that affects the data storage subsystem, the non volatile temporary storage can maintain the data for a period of time by continually self refreshing the data. An example of a data storage subsystem employing non volatile storage is the IBM® DS 6000.

The memory may be divided into logical memory blocks, and each has a logical indicator that indicates if the logical memory block is storing data to be destaged and is to be "preserved" across a code reboot or power loss.

Any time that a power loss event occurs while any region of the non volatile storage is marked "preserved", the hardware switches the non volatile storage from full system power to battery back up power and the firmware puts the non volatile storage into a self refresh mode.

A normal power off sequence, where there is some time available before power actually goes out, will destage data from the non volatile storage (and associated cache) to the data storage drives, such as disk drives. Once the non volatile storage is empty, the logical memory blocks corresponding to the non volatile storage will be marked as "non-preserved", and the self refresh mode is not implemented.

It may be that the non volatile storage data is preserved across a power cycle but is not needed. In one example, a "failover" or "quiesce" may have been conducted, moving the data from the present non volatile storage to another non volatile storage or cache, and then destaging the data. Global status tracks may be implemented in the data storage drive to indicate whether data of the non volatile storage is needed or has been destaged and is not needed.

Once power is resumed, the firmware will take the non volatile storage back out of self refresh node and begin an initial power on IML (Initial Microcode Load) sequence. As part of that sequence, areas marked "preserved" and that contain needed data are not tested by the IML process and the saved data may be destaged to the data storage drives. The control structures that describe the memory may be checked for validity, and, when the data is destaged, the data may be checked for corruption, for example, by error correction codes, to give an indication whether the preserved and needed data survived the power sequence.

If the non volatile storage was not preserved or contains data that is unneeded, the IML sequence tests the non volatile storage memory by writing and reading back test patterns looking for defective memory.

SUMMARY OF THE INVENTION

Data storage systems, methods and computer program products are configured to test unneeded data of the non volatile storage. This testing of unneeded data of the non volatile storage verifies the non volatile storage by indicating whether the data survived the power cycle from full power to self refresh mode battery power to full power, without risking the loss of data that is needed.

In one embodiment, the non volatile storage, at least regions of which may be marked as preserved, is verified by detecting whether at least one region of the non volatile storage is marked as preserved; if at least one region of the non volatile storage is marked as preserved, detecting whether data of the preserved at least one region is unneeded; and if the preserved at least one region stores data that is detected as unneeded, conducting a read only test of the non volatile storage of the type to determine whether data thereof is correctly preserved.

In a further embodiment, the non volatile storage may communicate with at least one data storage drive having global status tracks; the preserved detecting step is conducted subsequent to a power cycle of the non volatile storage; and the unneeded detecting step comprises reading the global status tracks to determine whether data of the preserved at least one region is unneeded.

In another embodiment, the read only test comprises reading the non volatile storage and detecting data parity to determine whether the data parity is within acceptable limits, indicating that data thereof is correctly preserved.

In a still further embodiment, the read only test additionally comprises detecting ECC uncorrectables to determine whether the ECC uncorrectables are within acceptable limits, indicating that data thereof is correctly preserved.

In another embodiment, additionally, if the read only test verifies that data thereof is correctly preserved, a write and readback test is conducted of the non volatile memory.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
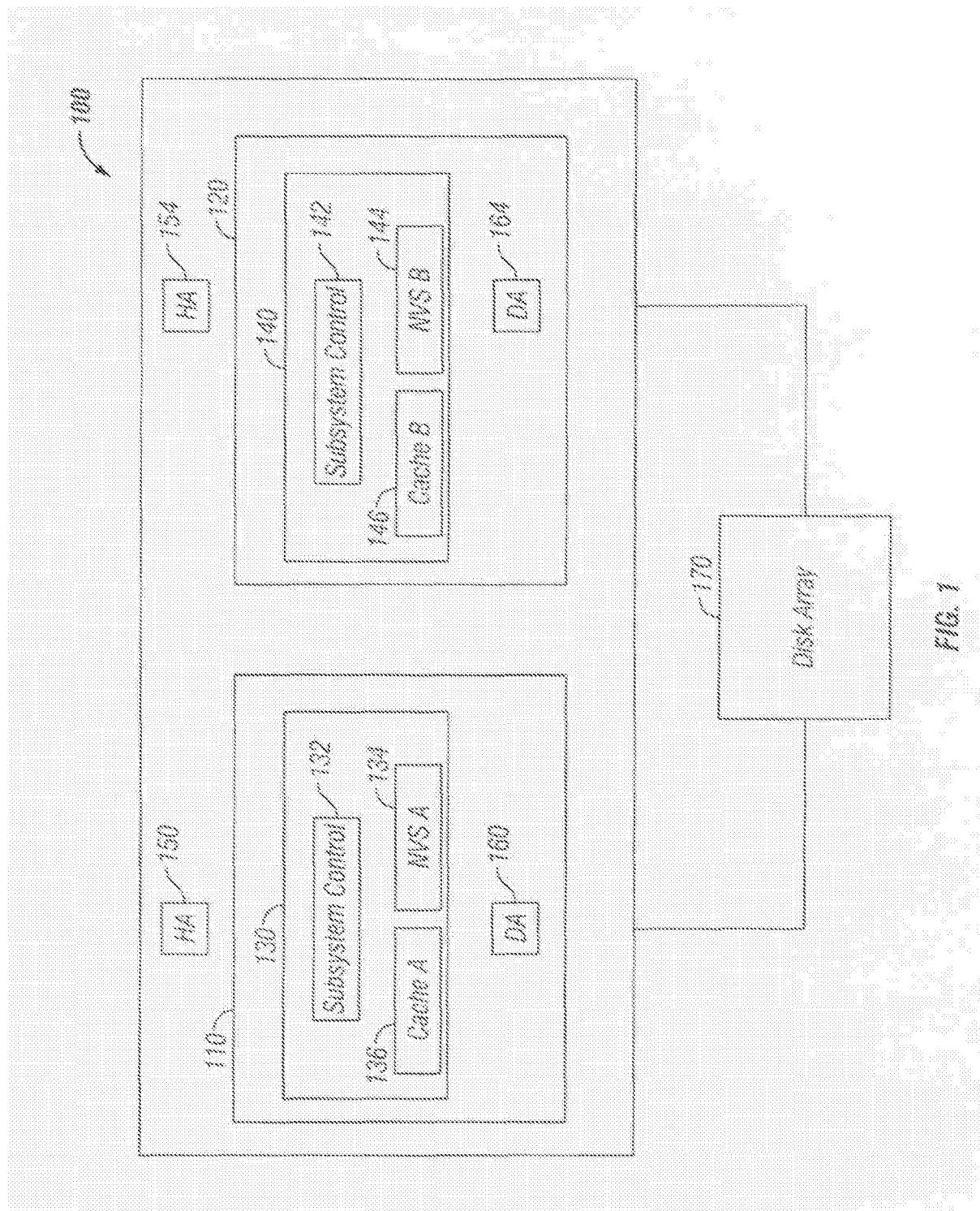
FIG. 1 is a block diagram illustrating a data storage subsystem which may implement embodiments of the present invention.

Referring to FIG. 1, a data storage subsystem 100 comprises a cluster 110 and another cluster 120. Cluster 110 comprises a complex 130 embodying at least subsystem control 132, a local non volatile data storage 134, and local cache data storage 136. Similarly, cluster 120 comprises a complex 140 embodying at least subsystem control 142, a local non volatile storage 144, and local cache data storage 146. In each cluster, the subsystem control may be wholly separate from the remainder of the complex, or may be partially embodied by the local non volatile data storage and/or local cache data storage. Further, the cache data storage and the non volatile storage may comprise different areas of a memory system.

The subsystem control 132, 142 comprises logic and/or one or more microprocessors with memory for storing information and program information for operating the microprocessor(s). Herein "processor" or "control" may comprise any suitable logic, programmable logic, microprocessor, and associated or internal memory for responding to program instructions, and the associated or internal memory may comprise fixed or rewritable memory or data storage devices. The program information may be supplied to the subsystem control or memory from a host or via a data storage drive or disk array, or by an input from a floppy or optical disk, or by being read from a cartridge, or by a web user interface or other network connection, or by any other suitable means. The program information thus may comprise one or more program products comprising a computer useable medium having computer usable program code tangibly embodied therein for operating the cluster 110 and/or for operating the cluster 120, or similar types of systems or devices.

The non volatile data storage 134, 144 may comprise a memory system having a battery backup that protects data even if power is lost, or other suitable non volatile memory. Cache data storage 136, 146 may comprise any suitable memory system and may be volatile, potentially losing data after power is removed.

Host adapters 150, 154 may comprise one or more Fibre Channel ports, one or more FICON ports, one or more ESCON ports, one or more SCSI ports, or other suitable ports. Each host adapter is configured to communicate with a host system and to both cluster 110 and cluster 120 such that each cluster can handle I/O from any host adapter.

Device adapters 160, 164 may comprise communication links for communication with disk drives or disk drive systems, such as disk array 170. Alternatively, magnetic tape drives may substitute for the disk array. The disk array may utilize RAID (Redundant Array of Independent Disks) protocols, or may comprise JBOD (Just a Bunch of Disks) arrays. The communication links may comprise serial interconnections, such as RS-232 or RS-422, Ethernet connections, SCSI interconnections, ESCON interconnections, FICON interconnections, a Local Area Network (LAN), a private Wide Area Network (WAN), a public wide area network, Storage Area Network (SAN), Transmission Control Protocol/Internet Protocol (TCP/IP), the Internet, and combinations thereof.

An example of a data storage subsystem 100 comprises an IBM® Enterprise Storage Server, IBM® Model DS 6000, or other comparable system.

As discussed above, received data, for example data from a host, may be temporarily stored in non volatile storage 134, 144 while it is in the process of being stored in the data storage drives 170 and/or transmitted to a remote site for backup storage. Thus, if there is a power outage that affects the data storage subsystem, the non volatile temporary storage can maintain the data for a period of time by continually self refreshing the data.

Figure 2:
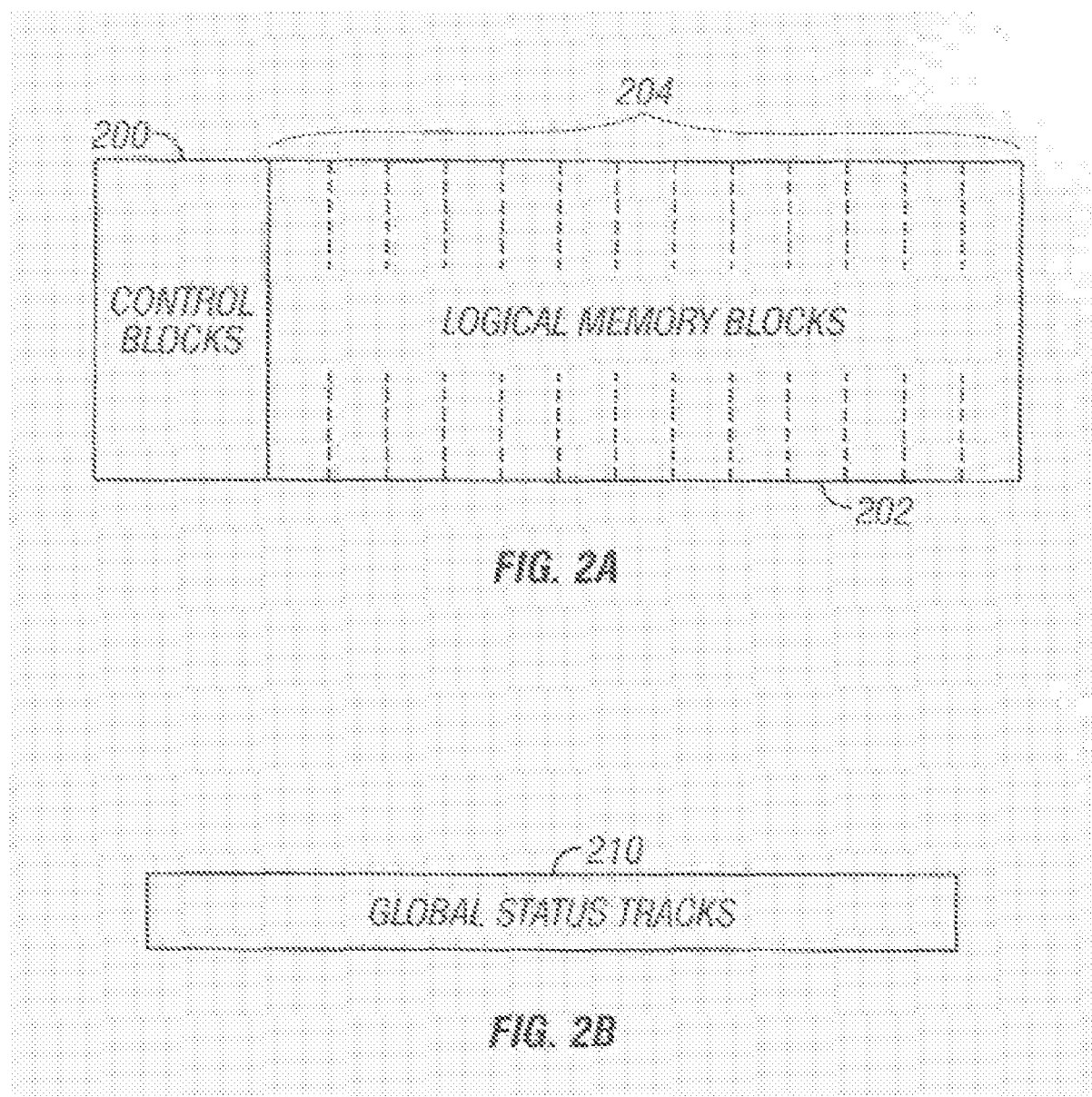
FIGS. 2A and 2B are diagrammatic illustrations of selected information areas respectively of the non volatile storage and of the disk array of FIG. 1.
Figure 3:
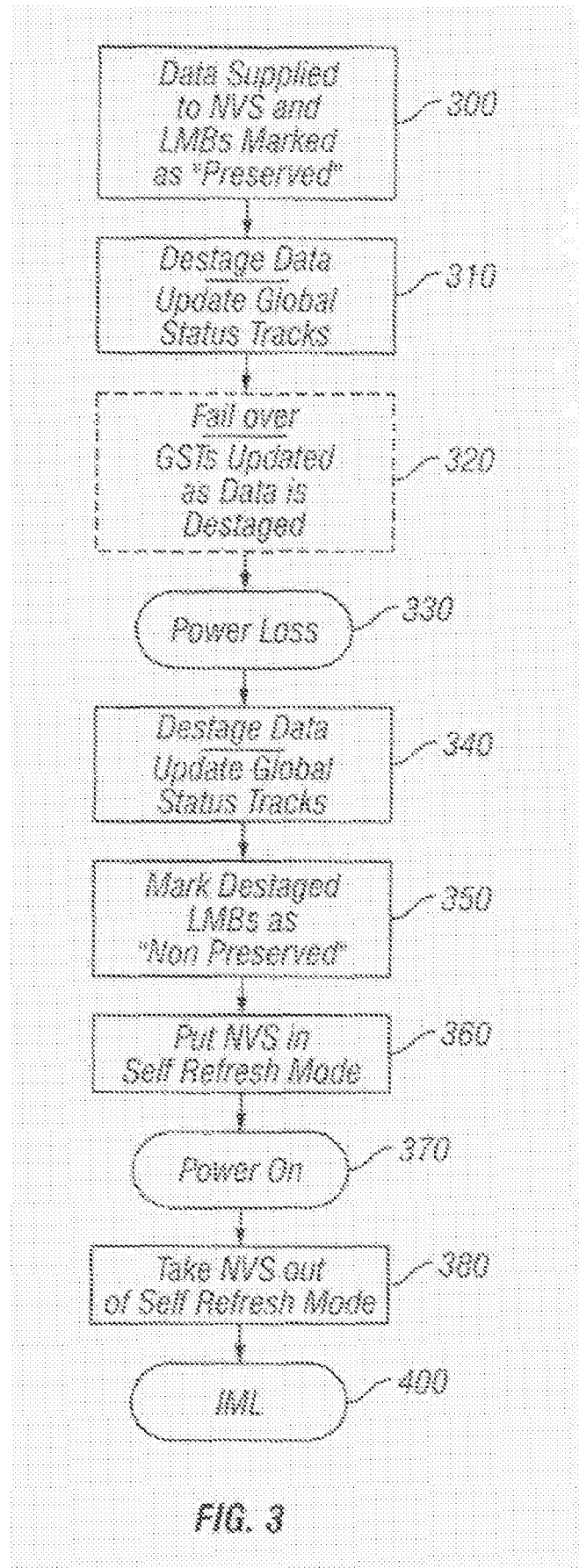
FIG. 3 is a flow chart depicting a method of operating the non volatile storage of FIG. 1 with a power loss.
Figure 4:
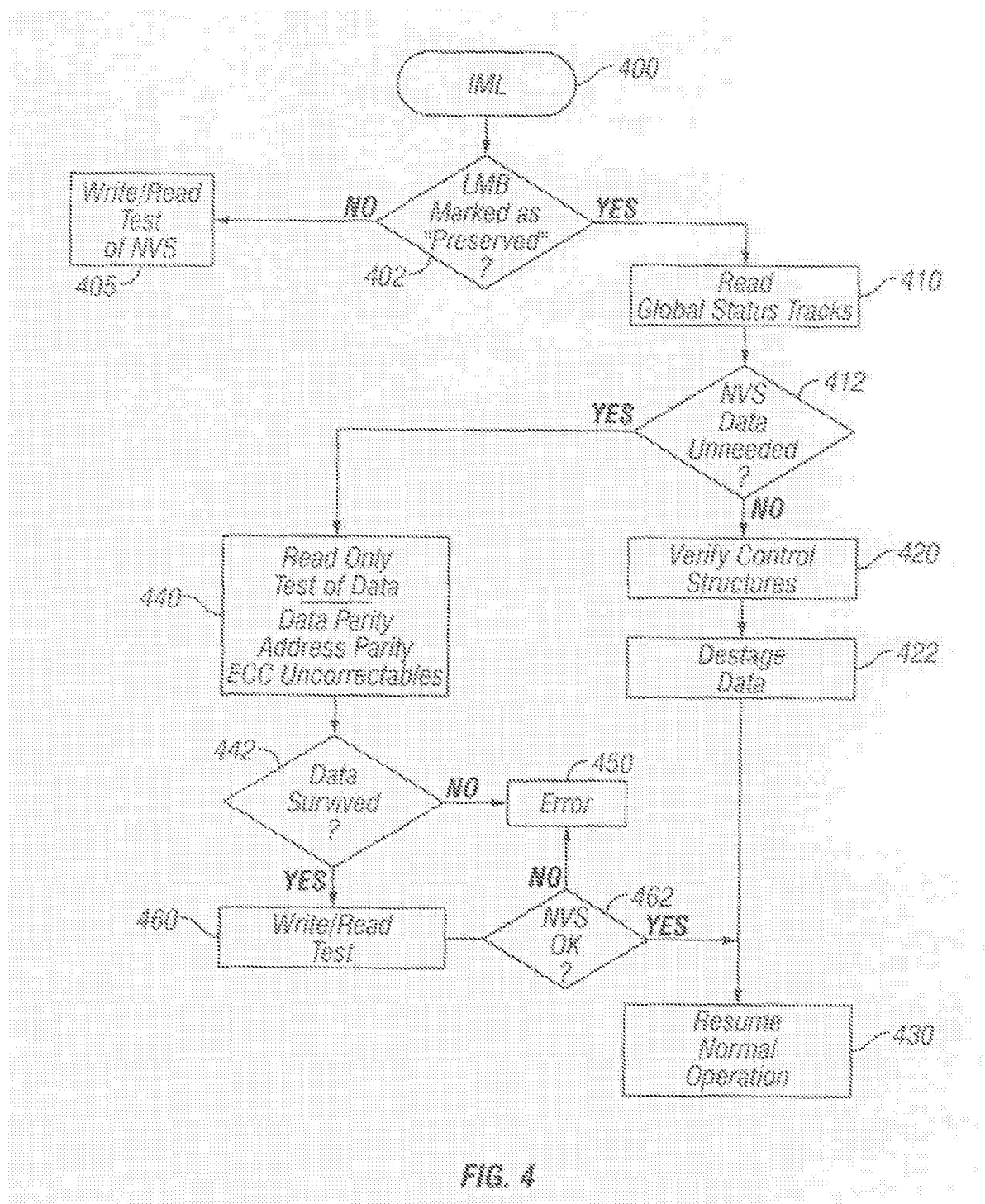
FIG. 4 is a flow chart depicting an embodiment of a method of the present invention.

Referring additionally to FIG. 2A, the non volatile storage 134, 144 may be arranged in a specific format. For example, it may be divided between a control area 200 and customer data area 202. The control area 200 may contain information such as structures which describe the non volatile storage arrangement, a track identifier list of tracks ("tracks" may be a term that is used to identify groupings of customer data and not necessarily physical tracks on disk media), mailboxes to perform commit operations of new customer tracks, track control blocks that contain information describing the customer tracks, etc.

The customer data area may be divided into logical memory blocks (LMB) 204, or other arrangements, such as areas or regions, and each has a logical indicator in the control area 200 that indicates if the logical memory block is storing data to be destaged and is to be "preserved" across a code reboot or power loss. This logical indicator is only for the customer data logical memory block of the non volatile storage 134 or 144. Referring additionally to FIG. 2B, information whether data has or has not been destaged to the disk array 170 from either non volatile storage is contained in global status tracks 210 of the disk array 170. For example, three copies of the global status tracks 210 may be maintained at various places in the disk array. Herein, the term logical memory block or LMB is representative of portions of any suitable organization of the non volatile storage, and is also termed area or region.

At the end of an initial IML (Initial Microcode Load) for the data storage system 100, the non volatile storage 134, 144 for each cluster 110, 120 is marked "preserved". The "preserved" indicator remains set until either of the following events occur:

1. A successful shutdown that destages all data from caches and non volatile storage to the data storage drives 170. Each non volatile storage 134, 144 will un-preserve the non volatile storage logical memory blocks 204, changing the indicator in the control area 200 and the global status tracks 210 will be updated to indicate that the data has been destaged.
2. A successful quiesce or failover of a cluster 110 or 120 to the other, for example, when servicing a cluster. This is known as going from a dual cluster mode in which each cluster has all of the customer data shared between cache and non volatile storage (one cluster has the cache data of the other cluster in its non volatile storage and vice versa), to single cluster mode in which only one cluster keeps all of the customer data. At the end of the quiesce, the logical memory blocks of the cluster to be serviced are indicated in the control area 200 as non-preserved. The global status tracks 210 are updated to indicate that the non volatile storage of the both clusters now have the customer data.

A code reboot or power loss any time after the initial IML and before either step 1 or step 2 will result in having customer data in the non volatile storage.

Any time that a power loss event occurs while any region of the memory is marked "preserved", the hardware switches the memory from full system power to battery back up power and the firmware puts the memory into a self refresh mode.

A normal power off sequence, where there is some time available before power actually goes out, will destage all data from the non volatile storage (and associated cache) to the data storage drives, such as disk array 170. Once all the data of the non volatile storage has been transferred, the logical memory blocks corresponding to the non volatile storage will be marked as "non-preserved", and the self refresh mode is not implemented.

Referring to FIGS. 1, 2A, 2B and 3, beginning in step 300, the normal operation of the non volatile storage 134, 144 is described. As discussed above, in step 300, the data is supplied, for example from a host system, to the non volatile storage 134, 144 and the logical memory blocks 204 are marked as "preserved". Data may also be supplied to the cache 136, 146. In the normal situation, the data is duplicated between the two clusters 110 and 120 in that the same data is stored in cache 136 and non volatile storage 144, and the same data is stored in cache 146 and non volatile storage 134, called dual cluster mode. In step 310, the data is destaged to the disk array 170 and the global status tracks 210 are updated with the information of the location of the data.

As discussed above, a failover or quiesce may occur in step 320 in which the data storage subsystem 100 switches from dual cluster mode to single cluster mode. When in single cluster mode, one of the clusters 110 or 120 claims all of the data and continues to destage the data to the disk array 170 and the global status tracks 210 continue to be updated. The failover or quiesce may be followed by a power loss 330. Alternatively, if there was no failover or quiesce in step 320, the data storage subsystem 100 attempts to destage, in step 340, as much of the data as possible before the power outage becomes effective. In step 340, the global status tracks are updated, and, if the destaging of step 340 was successful, in step 350, the logical memory blocks having the data that was destaged are marked as "non-preserved".

Before the power outage becomes effective, in step 360, at least the "preserved" logical memory blocks of the non volatile storage, and perhaps the entire non volatile storage, are put in self refresh mode and the non volatile storage continually refreshes the data stored in the self refresh areas of the storage.

At some point, in step 370, the power returns to the non volatile storage, and, in step 380, the storage is taken out of self refresh mode, and, in step 400, an IML of the non volatile storage is started.

Referring to FIGS. 1, 2A, 2B and 4, beginning in step 400, an IML process in accordance with the present invention, at step 402, determines whether any logical memory block (LMB) 204 of the non volatile storage 134, 144 is marked, for example, in control blocks 200, as "preserved". If not marked "preserved", the logical memory block may be unmarked, or may be marked "non-preserved". If none of the logical memory blocks are preserved, meaning that all the data of the non volatile storage has been transferred or "destaged" and the logical memory blocks may effectively be empty, in step 405, there is no data that can be reliably tested, and the standard IML sequence test of the non volatile storage memory is conducted by writing and reading back test patterns looking for defective memory. In the present example, all of the logical memory blocks must not be marked preserved in order to test the non volatile storage. Alternatively, the test may be conducted on a logical memory block by block basis.

If step 402 indicates that a logical memory block has been marked "preserved", step 410 accesses the global status tracks 210 to determine from the global status tracks, in step 412, whether data of the preserved logical memory block(s) is needed or not. For example, as discussed above, there may have been a failover or quiesce and the data destaged from the alternative storage, such that the preserved data is not needed. If the data is needed, contents of the non volatile storage that were preserved comprise customer data that has not been destaged to the disk array 170. The control structures that describe the non volatile storage layout may be checked for validity in step 420, for example by verifying the longitudinal redundancy checking for the control structures.

If the control structures are valid, the mailboxes may be read and processed to perform any customer track commit or discard operations with respect to incoming mail that was received but not processed at the time of the power loss. Once the mail is processed, the global status tracks 210 are checked to determine which customer tracks exist in the non volatile storage and which customer tracks contain the needed data. For each customer track, the data is restored from the non volatile storage to the cache. The data may be checked for corruption, for example, by error correction codes, to give an indication whether the needed data survived the power sequence. In step 422, the needed data is destaged to the disk array 170. The checking of the control structures and/or the verification of the data may be conducted of individual tracks or of individual LMBs so that the non volatile storage customer segments that contain customer data are verified and those that did not are not verified, or alternatively, the entire non volatile storage may be verified. Normal operation of the non volatile storage continues in step 430.

The check of the global status tracks in step 412 may indicate that the data that was preserved in the non volatile storage is unneeded. This can occur in cases where the data storage system 100 had previously performed a quiesce or failover from a dual cluster mode to a single cluster mode, so that the other cache and non volatile storage contained all of the data, and then the power loss, etc., occurred. The non volatile storage that was failed away from will still place the non volatile storage into self refresh mode upon detecting the power loss, and will maintain the non volatile storage across the power loss. Since the non volatile storage comprises "preserved" data per step 402, the firmware will not test the non volatile storage.

The present invention, in step 440, conducts a read only test of the non volatile storage of the type to determine whether the unneeded data is correctly preserved. The test may be conducted of individual LMBs, or alternatively, of the entire non volatile storage. This testing of unneeded data of the non volatile storage verifies the non volatile storage by indicating whether the data survived the power cycle of step 330 through 370, without risking the loss of data that is needed.

Examples of read only testing comprise detecting data parity to determine whether the data parity is within acceptable limits, indicating that data thereof is correctly preserved, comprise detecting address parity to determine whether the parity of the addresses of the data are within acceptable limits; and comprise detecting ECC uncorrectables to determine whether the ECC uncorrectables are within acceptable limits, indicating that data thereof is correctly preserved.

Step 442 determines from a test or tests of step 440 whether the data survived the power cycle. If not, step 450 indicates an error. If the data did survive according to steps 440 and 442, meaning that the non volatile storage successfully saved and preserved the data through the power cycle, the non volatile storage may be tested in step 460 by a write and read test, for example by writing and reading back test patterns looking for defective memory. Step 462 determines from test 460 whether the non volatile storage is OK. If not, step 450 indicates an error. If the non volatile storage is OK, normal operation of the non volatile storage continues in step 430.

Thus, the data that has been preserved, but is not needed, and as the result of a quiesce or failover to another non volatile storage, etc., is tested to verify the non volatile storage by indicating whether the data survived the power cycle from full power to self refresh mode battery power to full power, without risking the loss of data that is needed.

Those of skill in the art will understand that changes may be made with respect to the operations discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for verification of non volatile storage, at least regions of which may be marked as preserved, comprising the steps of:
   detecting whether at least one region of said non volatile storage is marked as preserved;
   if at least one region of said non volatile storage is marked as preserved, detecting whether data of said preserved at least one region is unneeded; and
   if said preserved at least one region stores data that is detected as unneeded, conducting a read only test of said non volatile storage of the type to determine whether data thereof is correctly preserved.

2. The method of claim 1, wherein said non volatile storage may communicate with at least one data storage drive having global status tracks; wherein said preserved detecting step is conducted subsequent to a power cycle of said non volatile storage; and wherein said unneeded detecting step comprises reading said global status tracks to determine whether data of said preserved at least one region is unneeded.

3. The method of claim 2, wherein said read only test comprises reading said non volatile storage and detecting data parity to determine whether said data parity is within acceptable limits, indicating that data thereof is correctly preserved.

4. The method of claim 3, wherein said read only test additionally comprises detecting ECC uncorrectables to determine whether said ECC uncorrectables are within acceptable limits, indicating that data thereof is correctly preserved.

5. The method of claim 2, additionally, if said read only test verifies that data thereof is correctly preserved, conducting a write and readback test of said non volatile memory.

6. A data storage system comprising:
non volatile storage configured to store data; and
a storage control configured to
detect whether at least one region of said non volatile storage is marked as preserved;
if at least one region of said non volatile storage is marked as preserved, detect whether data of said preserved at least one region is unneeded; and
if said preserved at least one region stores data that is detected as unneeded, conduct a read only test of said non volatile storage of the type to determine whether data thereof is correctly preserved.

7. The data storage system of claim 6 wherein said storage control is configured to communicate with at least one data storage drive having global status tracks; wherein said storage control is configured to conduct said preserved detecting step subsequent to a power cycle of said non volatile storage; and wherein said storage control is configured to read said global status tracks to determine whether data of said preserved at least one region is unneeded.

8. The data storage system of claim 7, wherein said storage control read only test comprises reading said non volatile storage and detecting data parity to determine whether said data parity is within acceptable limits, indicating that data thereof is correctly preserved.

9. The data storage system of claim 8, wherein said storage control read only test additionally comprises detecting ECC uncorrectables to determine whether said ECC uncorrectables are within acceptable limits, indicating that data thereof is correctly preserved.

10. The data storage system of claim 7, wherein said storage control is configured to, if said read only test verifies that data thereof is correctly preserved, conduct a write and readback test of said non volatile memory.

11. A data storage system comprising:
at least one data storage drive configured to store data;
non volatile storage configured to store data; and
a storage control configured to:
destage data from said non volatile storage to said at least one data storage drive;
detect whether at least one region of said non volatile storage is marked as preserved;
if at least one region of said non volatile storage is marked as preserved, detect whether data of said preserved at least one region is unneeded in that said data has been destaged from said non volatile storage to said at least one data storage drive; and
if said preserved at least one region stores data that is detected as unneeded, conduct a read only test of said non volatile storage of the type to determine whether data thereof is correctly preserved.

12. The data storage system of claim 11 wherein said at least one data storage drive comprises global status tracks indicating data that has been destaged to said at least one data storage drive; wherein said storage control is configured to conduct said preserved detecting step subsequent to a power cycle of said non volatile storage; and wherein said storage control is configured to read said global status tracks to determine whether data of said preserved at least one region is unneeded.

13. The data storage system of claim 12, wherein said storage control read only test comprises reading said non volatile storage and detecting data parity to determine whether said data parity is within acceptable limits, indicating that data thereof is correctly preserved.

14. The data storage system of claim 13, wherein said storage control read only test additionally comprises detecting ECC uncorrectables to determine whether said ECC uncorrectables are within acceptable limits, indicating that data thereof is correctly preserved.

15. The data storage system of claim 12, wherein said storage control is configured to, if said read only test verifies that data thereof is correctly preserved, conduct a write and readback test of said non volatile memory.

16. A computer program product comprising a computer useable medium having a computer readable program, wherein the computer readable program, when executed on a computer, causes the computer to:
detect whether at least one region of said non volatile storage is marked as preserved;
if at least one region of said non volatile storage is marked as preserved, detect whether data of said preserved at least one region is unneeded; and
if said preserved at least one region stores data that is detected unneeded, conduct a read only test of said non volatile storage of the type to determine whether data thereof is correctly preserved.

17. The computer program product of claim 16, wherein said non volatile storage may communicate with at least one data storage drive having global status tracks; and wherein said computer readable program, when executed on a computer, causes the computer to conduct said preserved detecting step subsequent to a power cycle of said non volatile storage; and read said global status tracks to determine whether data of said preserved at least one region is unneeded.

18. The computer program product of claim 17, wherein said computer readable program, when executed on a computer, causes the computer to conduct said read only test by reading said non volatile storage and detecting data parity to determine whether said data parity is within acceptable limits, indicating that data thereof is correctly preserved.

19. The computer program product of claim 18, wherein said computer readable program, when executed on a computer, causes the computer to conduct said read only test additionally by detecting ECC uncorrectables to determine whether said ECC uncorrectables are within acceptable limits, indicating that data thereof is correctly preserved.

20. The computer program product of claim 17, wherein said computer readable program, when executed on a computer, causes the computer to, if said read only test verifies that data thereof is correctly preserved, conduct a write and readback test of said non volatile memory.

* * * * *